May 12, 1964
T. LAUFER
3,132,696
COLLECTIVE PITCH CONTROL FOR JET-DRIVEN
WINGS OF A ROTARY WING AIRCRAFT
Filed March 26, 1962
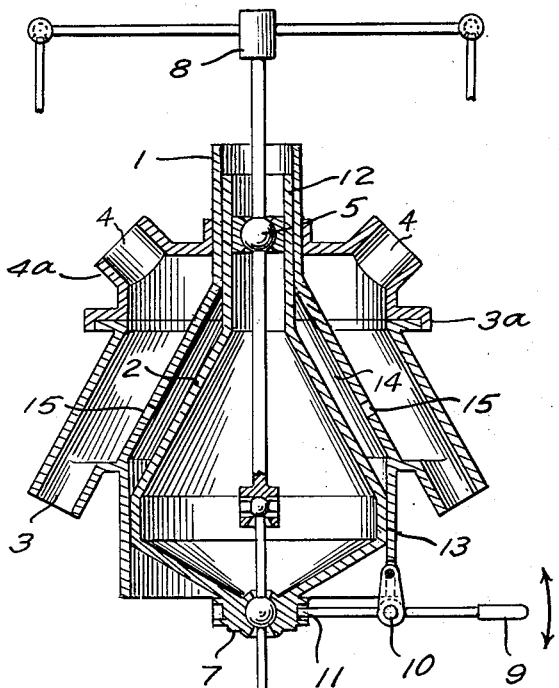
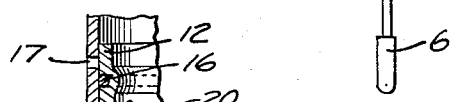
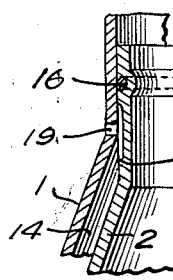
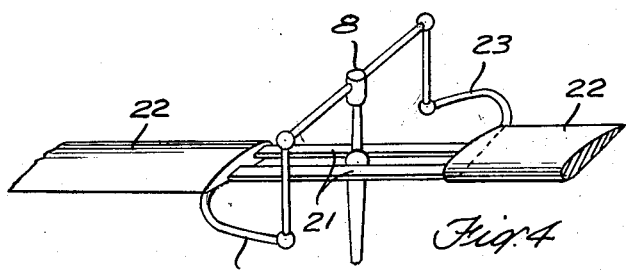
INVENTOR
THEODOR LAUFER
BY K.A. Mayr
ATTORNEY

United States Patent Office 3,132,696
Patented May 12, 1964

3,132,696
COLLECTIVE PITCH CONTROL FOR JET-DRIVEN
WINGS OF A ROTARY WING AIRCRAFT
Theodor Laufer, Friedrichshafen, Germany, assignor to
Dornier-Werke G.m.b.H., Friedrichshafen, Germany, a
firm of Germany
Filed Mar. 26, 1962, Ser. No. 182,205
Claims priority, application Germany Mar. 29, 1961
7 Claims. (Cl. 170—135.72)

This invention relates to apparatus for automatically controlling the pitch of vertical take-off aircraft rotor blades, such as, for example, rotor blades used on helicopters.

The pitch of helicopter rotor blades may be controlled by either a general or cyclical pitch control system. In a cyclical pitch control system, the angle of the rotor blade is varied with each revolution of the rotor. The variation of blade angle is brought about by a so-called "spider." The extent of the rotor blade angle depends on the inclination of the spider and is usually adjusted by the pilot by means of a linkage. In a general pitch control system, on the other hand, the angle of the rotor blades is varied simultaneously and uniformly, without phase displacement, in accordance with the respective desired flight conditions. When using a spider in the general pitch control system the entire spider and associated apparatus are moved up and down by the pilot through a linkage without changing the inclination of the spider.

Apparatus according to the present invention relates to a general pitch control system, and more particularly to apparatus for providing variations in the angle of a vertical take-off aircraft rotor blade in relation to flight conditions. Apparatus constructed according to the invention may be used, for example, on a helicopter of the type having a rotor driven by compressed air or gas. Nozzles at the ends of the rotor blades may be provided where additional combustion may take place for driving the blades. As to applying the construction according to the present invention to the following description, it will be assumed that the cross sectional areas of the exit of the nozzles at the end of the rotor blades will remain constant. Consequently, the pressure of compressed air or gas for driving the rotor blades will depend on the power of the engine used for supplying the compressed air or gas and such pressure will rise with increasing power.

Vertical take-off aircraft power requirements and vertical take-off aircraft flight conditions are closely interrelated. For example, maximum engine power is required for climbing or for maximum speed. During such flight conditions a steeper rotor blade angle is also required. During cruising, a medium blade angle is associated with medium or cruising power while during descent, the power requirement drops and the optimum blade angle decreases corresponding to the descending speed. During functioning of a helicopter as an autogiro, the power supplied to the rotor blades would be zero while the rotor blade angles are at a minimum. After landing and when the engine is stopped the rotor blade angles must be set at zero. From the above description it can be seen that the power requirement and the optimum rotor blade angle correspond to the flight conditions.

Since the pressure of air or gas for driving the rotor blades is proportional to the power developed by the engine, it is possible to determine the relationship between such pressure and the rotor blade angle and to provide an operating coupling for varying the blade angle in response to such pressures. In this way an automatic general pitch control may be achieved. Such an operating coupling should, however, be provided with a certain amount of flexibility. If the operating coupling were rigid, the scope of operation of the aircraft would be impaired. For example, if the engine stopped close to the ground, the automatic reduction of blade angle would be dangerous since the aircraft would not have the necessary altitude to go into horizontal flight and the aircraft would crash.

Another disadvantage of providing a rigid operating coupling is that such a coupling would be unable to provide for maximum power and minimum blade angle as required, for example, while raising a helicopter rapidly from the ground such as in a jump take-off. Also a rigid operating coupling would not permit the use of the rotor as a kinetic energy accumulator since, in such a case, the rotor could not be charged wherefor high power drive and small blade angle are required.

It is an object of the present invention to provide apparatus which is able to avoid and overcome the above-mentioned and other difficulties and to provide a simplified automatic general pitch control system for use with rotors used on vertical take-off aircraft. This object is achieved, according to the invention, by having a portion of the rotor hub form a fixed cylinder in which a portion of the control hub operates as a movable piston. The piston, or control hub, is moved by the pressure of the driving gaseous medium such as compressed air in the cylinder or rotor head against a restoring force tending to restore the original position of the control hub or piston. A mechanism is provided for changing the pitch angle of the rotor blades by the movement of the compressed air pressure actuated piston or control hub. The advantage of this arrangement is that no special pressure chamber equipped with valves is required to control the pressure and to transmit an equalizing force to the control.

In the apparatus according to the present invention, apertures are provided at the upper and lower ends of the pressure cylinder, or rotor hub, for the supply of a gaseous medium in such a way that filling of the cylinder with water is prevented. With such a construction, additional means for eliminating water from the rotor hub, such as a water separator, is not required. Furthermore, the straps used for suspending the rotor blades may be used for providing the restoring force. It is also possible, according to the present invention, to provide an automatic pitch control which permits the use of existing structural elements for different and new purposes, thereby reducing cost considerably.

For a better understanding of the present invention reference should be had to the accompanying drawing, wherein like numerals of reference indicate similar parts throughout the several figures and wherein:

FIG. 1 is a schematic vertical sectional view of a rotor head constructed according to the invention.

FIG. 2 is a partial vertical section view of a rotor head according to the invention, illustrating certain details of the relationship between the rotor hub and the control hub.

FIG. 3 is a partial vertical sectional view of the rotor head shown in FIG. 2 taken at a different radial plane.

FIG. 4 is a perspective schematic view showing the connection between the spider and the rotor blades.

The embodiment illustrated in the drawing is used in connection with a vertical take-off aircraft having a central compressor for compressing air for driving the rotor blades whereby the reaction nozzles at the tips of the rotor blades may be provided with combustion means and no additional means for compressing air for actuating the blade pitch changing apparatus is required.

Referring to the drawing, a rotor head for a vertical take-off aircraft is shown in FIG. 1. The rotor head has a stationary member 1 including means for distributing and supplying compressed air to the rotor blades. The compressed air is supplied from a source, such as a compressor (not shown), and conducted through a feed element 3 forming part of the member 1 to the rotor blades through connecting conduits 4. The latter are formed on a member 4a rotatable with the wings of the aircraft and means 3a are provided to permit the member 4a to rotate relative to the member 1 and the feed element 3. A control member 2 is mounted for longitudinal movement in and coaxial of the member 1. The control member 2 rotatably carries a conventional spider 8 swivelably and rotatably mounted in the control member 2 by suitable mounting means 5.

The rotor blade angles are adjusted in known manner by raising and lowering the entire control member 2 and the spider 8. The spider 8, carried for longitudinal movement with the control member 2, may be raised and lowered by means of a lever 9. The lever 9 is pivotal at 10 by providing a pivot support 13 extending from the member 1 or by elements fastened to it. One end of the lever 9 engages the control member 2 at 11 while the other end can be moved directly or indirectly by the pilot in the directions indicated by the arrows in FIG. 1 for changing the pitch angle of the rotor blades. In contrast to conventional designs, the apparatus according to the present invention is such that the fixed portion of the rotor head, that is the member 1, and the moving portion of the collective pitch control, that is the control member 2, are so designed that sealing means is provided between the stationary member 1 and control member 2. With such a construction the control member 2 acts as a movable piston within the member 1, the member 1 acting as a fixed cylinder. The sealing means may consist of packing rings having frictional characteristics such that they will not hamper operation of the automatic pitch control while at the same time providing sufficient friction to create a damping effect in the control system in case the control member 2 (piston) tends to vibrate or move too quickly in the member 1 (cylinder) during automatic operation of the apparatus. The control member 2 which is generally conical for affording movement of the spider mechanism is provided with cylindrical end portions 12 and 13. These cylindrical portions 12 and 13 slide in corresponding cylindrical bores in the member 1. The member 1 is also provided with apertures 15 through which compressed air may enter a chamber 14 defined by a portion of the inner wall of the member 1 and a portion of the outer wall of the control member 2. The compressed air in the chamber 14 tends to move the control member 2 downwardly as viewed in FIG. 1. The force tending to return the control member to an upward position as viewed in FIG. 1, can be produced by providing resilient means such as springs, not shown, or by using a centrifugally operated device for this purpose. However, it is preferable that resilient means or springs 21 (see FIG. 4) provided for the suspension of the rotor blades or wings 22 be used for this purpose. A suitable central resilient mounting of the rotor blades is shown in Patents Nos. 2,845,131 and 3,073,394. The active forces acting on the control member 2, that is, the air pressure and the restoring force are balanced such that the optimum adjustment of the control member 2, and thus an optimum blade angle, is obtained for the rotor blades corresponding to the respective pressure of the compressed air in the chamber 14. The adjustment of the spider 8 for cyclic pitch control is brought about by known means, such as by providing a lever 6 pivotable in all directions on pivot means 7 on the control member 2.

The method of operation of the apparatus according to this invention is as follows: As mentioned previously, the operable coupling means for controlling the blades in response to the pressure of the compressed air is not rigid. The compressed air acts on the control member 2, and thus indirectly on the blade angle control lever 9, while a restoring means, such as a spring, tends to restore the position of the control member 2. When the control lever 9 is released, the angle of the blades is controlled automatically in response to the compressed air pressure in the chamber 14. When the control lever 9 is held in position by the pilot, the force acting on the control lever 9 will indicate the flight conditions to the pilot. The control lever 9 may be provided with a throttle, so that the pilot merely needs to control the throttle on the control lever 9, while the blade angles will be changed automatically by the pressure of the compressed air in the chamber 14. Thus the piloting of the aircraft is made very simple. If desired, the pilot can, at any time, manually vary the blade angles by moving the control lever 9. For example, the blade angles may be changed in order to store kinetic energy in the rotor. In such a case, the air pressure delivered by the compressor will be relatively high due to increased throttle opening, but the rotor blade angle can be made very small since the pilot can intervene in the automatic operation of the pitch control by manually operating the lever 9. When flying close to the ground the pilot should hold the throttle and the blade angle control lever 9 in his hand. In case of engine failure, the reduced force acting on the control lever 9 will warn the pilot directly and he can effect the necessary change in the angle of the rotor blades and land by use of the kinetic energy stored in the rotor blades. When the engine is stopped after landing, the minimum blade angle will be set automatically as required.

FIG. 2 shows a detail view of the structural relationship between the stationary member 1 and the control member 2. Sealing means are provided between the member 1 and the control member 2 for preventing compressed air in the chamber 14 from passing between the two members. The sealing means includes seals or packings 16 within grooves in the cylindrical portions 12 and 13 of the control member. Compressed air is introduced into the chamber 14 through an opening 15 at the lower part of that portion of the member 1 which is used for defining the chamber 14. An opening 19 may also be provided at the upper portion of the member 1. The openings 15 and 19 may be circumferentially spaced from one another such as, for example, 90 degrees apart. As is more clearly shown in FIG. 3, a groove 20 may be provided in the control member 2 so that the opening 19 and the groove 20 cooperate to provide communication between the aperture 19 and the interior of the chamber 14. The openings 15 and 19 are preferably staggered along the circumference of the member 1. The above described arrangement of the openings 15 and 19 prevents the chamber 14 from becoming filled with water while at the same time providing equalized pressure throughout the chamber 14. When the pressure in the chamber 14 is low, the control member 2 will be in an upper position and the pitch angle of the rotor blades will be relatively small. It is assumed that the spider 8 is connected to the rear portion of the rotor blades. In this upper position of the control member, the supply of compressed air to the chamber 14 will be cut off since the control member 2 will block off the openings 15 and 19. However, another opening 17 is provided in the upper portion of the member 1. The opening 17 cooperates with a groove 18 in the control member 2 to provide communication between the chamber 14 and the opening 17. The opening 17 is in communication with the surrounding atmosphere. With this arrangement the pressure in the chamber 14 will be equivalent to atmospheric pressure when the control member is in its upper position. When the control member 2 is in its upper position the air in the chamber 14 will be blown out through the opening 17. Overlapping of the openings 17, 19, 15 may be provided so that the opening 17 is in communication with the chamber 14 at the same time that the opening 15 and/or 19 is in communication with the chamber 14. The overlapping may be so arranged that the air or gas will be blown out of the opening 17. With this arrangement, separate means for removing water from the chamber 14 is not required. Also since the chamber 14 is exposed to atmospheric pressure when the angle of the rotor blades is at a minimum, there will not be any force tending to move the control lever 9. This is advantageous, particularly in a jump take-off when it is desired to have the aircraft rise quickly, since the rotor blade is in an unloaded condition, the blade angle being zero due to the blade springs 21, and the pressure of compressed air is high. Consequently, a small movement by hand of the control lever 9 will be sufficient to start operation of the automatic pitch control when the rotor has achieved the necessary speed.

FIG. 4 schematically shows as an example the connection between the spider 8 and the rotor blades 22 of a two blade rotor. Members 23 connect the spider 8 to the rear edges of the rotor blades 22. The rotor blades 22 are suspended in a known manner (by means not shown) on the springs 21. By increasing the pressure in the chamber 14 the control member 2 will be moved downwardly, thereby lowering the entire spider 8. As the spider 8 is lowered, the trailing edges of the rotor blades 22 will be lowered uniformly to increase the angle or pitch of the rotor blades 22. The resiliency of the springs 22 will act as a restoring force tending to keep the blade angle or pitch at a minimum. Other means may be used for creating this restoring force as long as the relationship of the springs 21 and the means for providing the restoring force are such that they equalize, during autogiro flight of the aircraft, the aerodynamic moment and the moment of inertia to provide the necessary small blade angle for the rotor blades.

Tilting of the spider 8 causes lowering of the trailing edge of one rotor blade 22 while that of the other is raised.

Apparatus according to this invention permits extremely simple and automatic regulation of the general pitch control depending on the power driving the rotor while permitting the pilot to intervene and provide manual regulation at any time. A fixed portion of the rotor head, such as the member 1, and a moving part of the control system, such as the control member 2, are formed to provide a piston-cylinder arrangement. Due to the cut-off of air or gas supply to the chamber 14 with minimum blade angle, it is possible to obtain maximum engine power with minimum blade angle while the control lever 9 is free from any forces acting thereon.

Although the invention is described and illustrated at the assumption that compressed air is used for actuating the control apparatus, it is obvious that a different gas of sufficient pressure can be used without departing from the scope of the invention.

What is claimed is:

1. A collective and cyclic pitch control arrangement for jet-driven wings of a rotary wing aircraft, comprising:
   rotor hub means rotatable with the wings of the aircraft,
   conduit means formed in said hub means for conducting operating gas to said wings,
   a stationary member including means rotatably supporting said hub means,
   said stationary member including a hollow cylinder means,
   a hollow piston means axially movable in said cylinder means,
   means operatively connected to said wings and to said piston means for increasing the wing angle upon movement of said piston means in one direction,
   restoring means operatively connected to said wings for decreasing the wing angle and moving said piston means in the opposite direction,
   conduit means formed in said stationary member and communicating with said conduit means in said hub means for conducting operating gas thereto,
   at least one aperture in said stationary member communicating said conduit means in said stationary member with said cylinder means for moving said piston means in said one direction upon an increase of the pressure of the operating gas for increasing the wing angle and for allowing said restoring means to move said piston means in the opposite direction upon a decrease of the pressure of the operating gas, and
   steering means placed inside said hollow piston means and mounted thereto for pivoting in all directions and operatively connected to said wings for cyclic pitch control.

2. A collective pitch control arrangement for jet-driven wings of a rotary wing aircraft, comprising:
   rotor hub means rotatable with the wings of the aircraft,
   conduit means formed in said hub means for conducting operating gas to said wings,
   a stationary member including means rotatably supporting said hub means,
   said stationary member having a hollow top portion, a hollow middle portion coaxial of and below said top portion and diverging in downward direction, and a hollow portion below said middle portion and coaxial of said top portion,
   a hollow control member placed inside said stationary member and having a hollow top part axially movably and gas-tightly fitted into said top portion, a hollow middle part below said top part and diverging in downward direction, and a hollow part placed below said middle part and coaxial of said top part, said part placed below said middle part being axially movably and gas-tightly fitted in said portion of said stationary member below said middle portion,
   means operatively connected to said wings and to said control member for increasing the wing angle upon downward movement of said control member,
   restoring means operatively connected with said wings for decreasing the wing angle and upwardly moving said control member,
   conduit means formed in said stationary member and communicating with said conduit means in said hub means for conducting operating gas thereto,
   said stationary member and said control member forming a chamber between said middle portion and said middle part, the volume of said chamber increasing upon downward movement of said control member in said stationary member and conversely, and
   at least one aperture in said stationary member communicating said conduit means in said stationary member with said chamber for admitting operating gas to said chamber and downwardly moving said control member upon an increase of the pressure of the operating gas for increasing the wing angle and for allowing said restoring means to upwardly move said control member upon a decrease of the pressure of the operating gas.

3. A collective pitch control arrangement as defined in claim 2 wherein said hollow top portion, said hollow top part, said hollow portion below said middle portion, and said hollow part below said middle part are cylindrical, and said middle portion and said middle part are conical.

4. A collective pitch control arrangement as defined in claim 2 comprising a plurality of apertures in said stationary member, at least one of said apertures being adjacent to the lower part of said chamber for draining liquid therefrom.

5. A collective pitch control arrangement as defined in claim 2 comprising at least one opening communicating with the ambient air and placed in said top portion and being closed by said top part when said control member is in low position relative to said stationary member, and a groove in said control member placed opposite said opening and extending longitudinally of said control member for communicating said chamber through said groove and said opening with the ambient air when said control member is in high position relative to said stationary member.

6. A collective pitch control arrangement for jet-driven wings of a rotary wing aircraft, comprising:

rotor hub means rotatable with the wings of the aircraft,
conduit means formed in said hub means for conducting operating gas to said wings,
a stationary member including means rotatably supporting said hub means,
said stationary member having a hollow cylindrical top portion, a hollow conical middle portion coaxial of and below said top portion and diverging in downward direction, and a hollow cylindrical portion below said middle portion and coaxial of said top portion,
a hollow control member placed inside said stationary member and having a hollow cylindrical top part axially movably and gas-tightly fitted into said top portion, a hollow conical middle part below said top part and diverging in downward direction, and a hollow cylindrical part placed below said middle part and coaxial of said top part, said part placed below said middle part being axially movably and gas-tightly fitted in said portion of said stationary member below said middle portion,
means operatively connected to said wings and to said control member for increasing the wing angle upon downward movement of said control member,
restoring means operatively connected with said wings for decreasing the wing angle and upwardly moving said control member,
conduit means formed in said stationary member and communicating with said conduit means in said hub means for conducting operating gas thereto,
said stationary member and said control member forming a chamber between said middle portion and said middle part, the volume of said chamber increasing upon downward movement of said control member in said stationary member and conversely,
a manually operable member operatively connected to said control member for manually moving the latter in up and down direction,
at least one operating gas inlet aperture in said hollow top portion, and
a vertical groove in said top part opposite said aperture and above the lower end of said top part for communicating said conduit means in said stationary member through said aperture and said groove with said chamber for admitting operating gas to said chamber and downwardly moving said control member upon an increase of the pressure of the operating gas for increasing the wing angle and for allowing said restoring means to upwardly move said control member upon a decrease of the pressure of the operating gas,
said aperture being in the lower part of said top portion and closed by said top part when said control member is in uppermost position.

7. A collective pitch control arrangement as defined in claim 6 including an opening in said top portion above said aperture and opposite the upper end of said top part and being closed thereby when said control member is in low position relative to said stationary member, said opening communicating with the ambient air, and a groove in said control member placed opposite said opening and extending longitudinally of said control member for communicating said chamber through said last mentioned groove and said opening with the ambient air when said control member is in high position relative to said stationary member.

References Cited in the file of this patent

UNITED STATES PATENTS

| | | |
|---|---|---|
| 2,377,457 | Stalker | June 5, 1945 |
| 2,389,170 | Stalker | Nov. 20, 1945 |
| 2,552,008 | Laskovitz | May 8, 1951 |
| 2,557,338 | Caldwell | June 19, 1951 |
| 2,702,601 | Nagler | Feb. 22, 1955 |
| 2,845,131 | Laufer | July 29, 1958 |
| 2,919,753 | Hook | Jan. 5, 1960 |
| 3,073,394 | Laufer | Jan. 15, 1963 |

FOREIGN PATENTS

| | | |
|---|---|---|
| 1,002,007 | France | Oct. 31, 1951 |
| 733,063 | Germany | Mar. 18, 1943 |

OTHER REFERENCES

"Aircraft Engineering," magazine, page 293, October 1950.

"Aircraft Engineering," magazine, page 376, December 1951.